United States Patent [19]

Farrell

[11] 3,928,522

[45] Dec. 23, 1975

[54] METHOD OF MAKING A BLOW MOLDED CONTAINER WITH HOLLOW HANDLE

[75] Inventor: John J. Farrell, Green Brook, N.J.

[73] Assignee: Farrell Patent Company, Greenbrook, N.J.

[22] Filed: June 14, 1974

[21] Appl. No.: 479,547

[52] U.S. Cl. ............... 264/89; 264/97; 264/155; 264/161; 264/163; 264/296; 425/DIG. 209; 425/DIG. 214; 425/DIG. 215; 425/DIG. 216; 425/806

[51] Int. Cl.² ............... B29C 17/07; B29C 17/12

[58] Field of Search ............ 264/89, 90, 92, 94, 96, 264/97, 98, 99, 296, 161, 163, 155; 425/296, 302 B, 326 B, 387 B, 242 B, DIG. 209, DIG. 214, DIG. 212, DIG. 216, DIG. 215, 806

[56] References Cited
UNITED STATES PATENTS

| | | |
|---|---|---|
| 2,951,264 | 9/1960 | Bailey .................................. 264/98 |
| 3,649,728 | 3/1972 | Honsho et al. ................... 264/163 X |
| 3,662,048 | 5/1972 | Turner .............................. 264/89 X |
| 3,776,991 | 12/1973 | Marcus .................... 425/DIG. 216 |
| 3,781,395 | 12/1973 | Uhlig ............................... 264/98 X |

*Primary Examiner*—Jan H. Silbaugh
*Attorney, Agent, or Firm*—Marvin Feldman

[57] ABSTRACT

A plastic container having a bail handle on one side, blown as one-piece with the container, is formed by blow molding in a cavity having a portion into which one side of the parison is displaced to form a handle portion. A shearing operation is then performed on the partially blown container. In this operation part of the handle portion is compressed to a flat condition and displaced from the container between the body of the container and the part of the handle portion that will constitute the actual handle of the final container. The container is then blown to its final size, preferably in a second blowing mold.

16 Claims, 5 Drawing Figures

METHOD OF MAKING A BLOW MOLDED CONTAINER WITH HOLLOW HANDLE

BACKGROUND AND SUMMARY OF THE INVENTION

This invention provides an improved method for making blown plastic containers which have a hollow handle on one side with the handle of one-piece construction with the body of the container. The container is formed on an injection molding machine with a special pre-blow mold having a cavity into which a part of a parison is displaced to form a handle portion of the partially blown container. This handle portion which is hollow and curved along its outer edge region to the shape of the final handle, is then collapsed or compressed over a portion of its area.

The compressed area comprises the area between the body of the partially blown container and the outer part of the handle portion which will constitute a hollow bail handle of the final product. The compressed part of the handle portion is sheared from the remainder of the partially blown container and this shearing operation is performed while the molten material of the parison is still hot enough to seal over the lines where the compressed plastic is separated from the hollow portions of the partially blown container. These hollow portions are the handle along its entire length and the body portion to which the handle connects.

The blowing mold in which the parison is initially blown to form the partially blown container is of special construction. It has a plunger, shaped to the area which is to be compressed, and has a complementary support on the opposite side of the area that is to be compressed. The plunger and the support are both movable so as to apply force to opposite sides of the area of the handle portion which is to be compressed between them. After compressing the plastic between the plunger and the support so as to make it no longer hollow, the plunger and support are then moved in such a way as to shear the compressed area from the remainder of the handle portion, which is still hollow, and from the side of the partially blown container.

The sheared material is moved downward in the die and the apparatus has means for stripping the sheared material from the support so that it can be discharged to a waste receptacle and leave the support clear for operation on a second partially blown container.

The plunger and the support form portions of the wall of the cavity space into which plastic is displaced to make the handle portion.

Another feature used in the preferred embodiment of the invention is the stretching of the parison for a substantial distance lengthwise of the core rod on which the parison is formed. This stretching is preferably done after an initial blowing of the parison to free it from friction against the core rod and the stretching is preferably formed by the pressure of the blowing fluid that is introduced into the parison.

The blow mold in which the container is partially blown is preferably made with a diameter only slightly greater than the diameter of the original parison so that the initial blowing in the first blow mold does not expand the diameter or the circumference to any great degree but does the consequential stretching of the plastic for axial orientation in a lengthwise direction where the cavity of the mold is substantially longer than the parison.

In order to prevent sagging of the extended end of the parison, while in the first blow mold and during transfer from the first blow mold to a second blow mold, the preferred embodiment of the invention has a core rod with an end portion which telescopes into the main portion of the core rod. During stretching of the parison, the end of the core rod, which is telescoped into the main portion, is extended to a length approaching that of the partially blown parison so as to provide a support, if necessary, for the end of the parison which is beyond the original end of the core rod.

In the preferred embodiment, the partially formed container and its hollow handle are transferred to a second blow mold with a cavity shaped to the final contour of the container and in a subsequent blowing step, in this second blow mold, the partially blown container and handle are expanded to their final shape and size.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
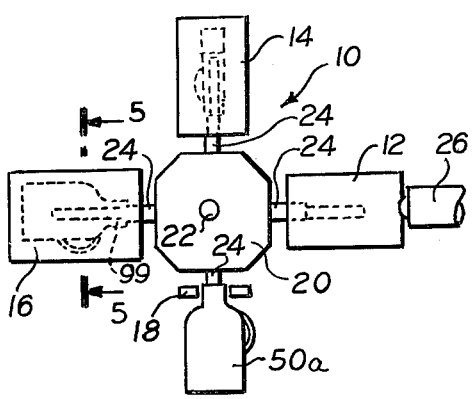
FIG. 1 is a diagrammatic top plan view of injection blow molding apparatus for making the containers with handles in accordance with this invention.

FIG. 1 shows an injection blow molding machine 10 having an injection station comprising a mold 12; a first blowing station comprising a blowing mold 14; a second blowing station comprising a blowing mold 16 and a fourth station comprising a stripper 18. These stations are located at 90° angular spacing around an indexing head 20 which rotates about a center shaft 22. Indexing head 20 has four faces corresponding to the operational stations with the molds 12, 14, 16 and the stripper 18.

A core rod 24 extends from each of the faces of the indexing head 20. Only one core rod 24 is shown for each face; but it will be understood that conventional blow molding machines have a plurality of core rods extending from each face and the core rods 24 are merely representative of core rods for carrying a parison and workpiece successively from one operational station to the next.

Molten plastic from a plasticizer 26 is injected into the mold 14 to coat the core rod 24 with a parison in accordance with conventional practice.

When the mold 12 opens, the indexing head 20 rotates 90° and carries the core rod 20 to the next operational station where the core rod and the parison are inserted into a mold 14.

Figure 2:
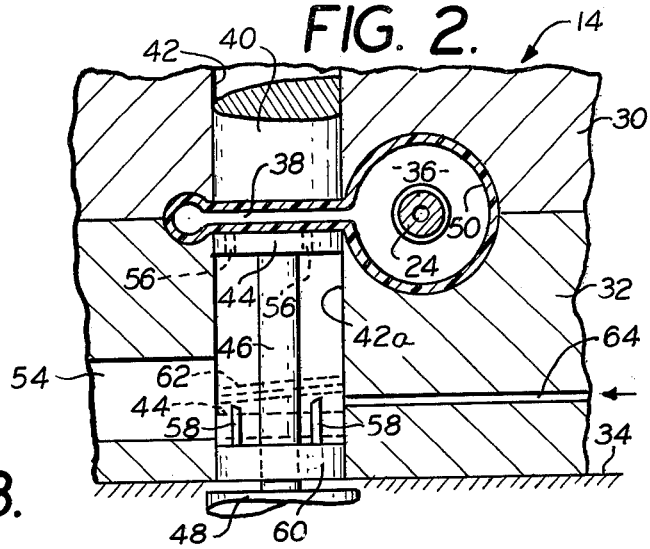
FIG. 2 is a fragmentary, greatly enlarged, sectional view on the line 2—2 of FIG. 1.

FIG. 2 shows the special construction of the first blow mold 14. This mold 14 has an upper section 30 and a lower section 32. The lower section 32 is connected to a fixed platen 34; and the upper section 30 moves up and down to open and close the mold in the conventional manner. The mold 14 has a cavity 36 which is of unusual construction. On one side of the core rod 24, the left side in FIG. 2, the cavity 36 extends for a substantial distance to form what may be termed a handle portion 38 of the cavity 36. Part of the wall of this cavity portion 38 is formed by the lower end of a generally semi-circular plunger 40, which slides up and down in a guideway 42 of the same cross section as the plunger 40.

A part of the lower surface of the handle portion 38 of the cavity is formed by the top surface of a support 44 located at the upper end of a piston rod 46. The cross section of the support 44 is substantially the same as that of the plunger 40. The support 44 slides in a guideway 42a which is actually a continuation of the guideway 42. The piston rod 46 is moved up and down by a cylinder-and-piston motor 48.

In the operation of the mold 14, the blowing of the parison expands it to the walls of the cavity 36, including the handle portion 38 of the cavity, but the cavity preferably contains air on the outside of the parison during the blowing operation. This air is preferably subject to some pressure during the blowing so as to act as a barrier to the expansion of the parison and preferably the compressing of the air in the cavity around the outside of the parison is sufficient to hold the plastic slightly spaced from the cavity wall or in only light contact with the wall so as to provide for lengthwise stretching of the parison in the body portion of the cavity 36 as will be explained in connection with FIG. 3.

The cavity 36 is substantially smaller than the intended final cross section of the container and the parison, partially blown to form a container, is indicated in FIG. 2 by the reference character 50.

When the plastic of the partially blown container 50 has reached the limits imposed by the cavity of the mold 14, and any barrier pressure within the mold, the plunger 40 and support 44 apply pressure to opposite sides of the area of the handle portion which is to be removed from the mold 14.

FIG. 2 shows the entire handle portion of the partially blown container 50 to be hollow; and it should be understood that in the molding of the parison on the core rod in the injection mold 12 (FIG. 1) there is more plastic applied to the side of the parison which will confront the handle portion 38 in the mold 14. Thus in the first blowing of the container 50, there is ample plastic to expand into the handle portion 38 of the cavity without causing a substantial reduction in the thickness of the wall across the handle portion 38.

After the partial blowing of the container 50 in the mold 14, the plunger 40 and support 44 apply pressure to opposite sides of the hollow center portion in the handle portion 38 of the mold cavity and collapse this hollow portion so that the upper and lower parts of the handle portion, between the plunger 40 and support 44 are pressed into contact with one another.

The plunger 40 continues to move downward and to press the support 44 downward until the support 44 reaches the broken line position indicated in dotted lines. In this lowered position, the support 44 is in line with a discharge outlet 54 opening through a side of the lower mold section 32. There are two openings 56 through the support 44. Pins 58 extend upward from a fixed plate 60; and these pins 58 are in line with the openings 56 and small enough to extend through the openings 56 and protrude above the top of the support 44 when the support is in its lowermost position, as indicated by broken lines in FIG. 2.

The material sheared from the handle portion of the partially blown container 50 is indicated in broken lines by the reference character 62. The pins 50 hold this sheared plastic 62 against further downward movement as the support 44 completes its downward stroke. Thus the sheared plastic 62 is stripped from the support 44, as shown in FIG. 2. A blast of air through a passage 64, which opens into the guideway 42a, blows the sheared plastic 62 out of the lower section 32 of the mold through the discharge outlet 54. This construction for stripping and discharging the sheared plastic 62 is merely representative of means for removing the sheared plastic from the mold 14.

Figure 3:
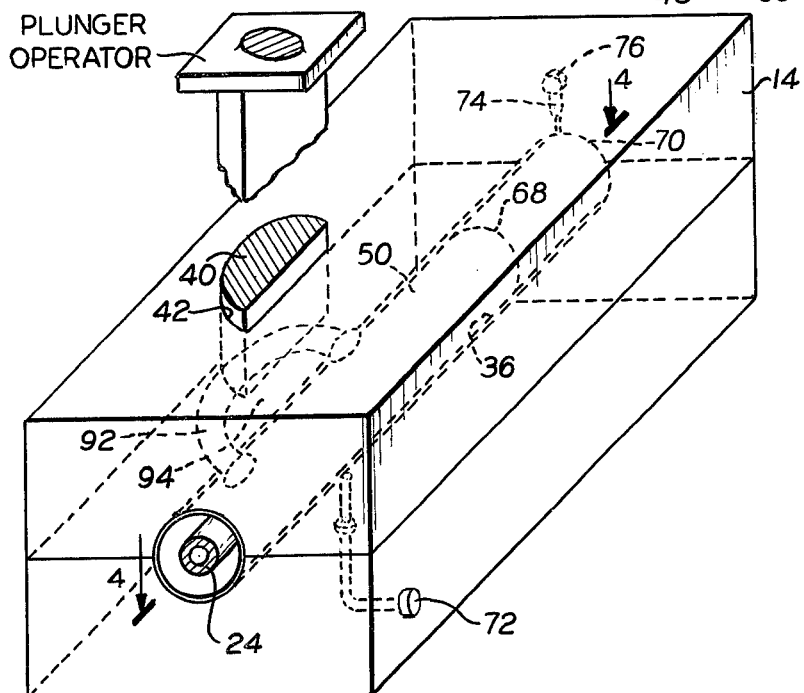
FIG. 3 is a diagrammatic, isometric view of the first blowing mold shown in FIGS. 1 and 2.

FIG. 3 is a diagrammatic showing of the mold 14 with the cavity 36 extending for a substantial distance beyond a plane 68 which marks the limit to which the parison extended in the mold cavity 36 prior to blowing of the parison. An end wall 70 of the cavity 36 determines the extent to which the partially blown parison can extend during the blowing operation in the mold 14. There is an air inlet passage 72 leading to the cavity 36 for supplying air for the barrier or cushion against total expansion in the cavity 36, as previously explained. There is an air outlet 74 at the far end of the cavity 36 which is adjustable to control the rate of escape of air from the cavity and the resulting cushioning effect. This adjustment is effected by a needle valve 76 on the exhaust outlet 74.

The plastics of the partially blown container 50 is stretched in the direction of the length of the core rod 24 as a result of air introduced into the interior of the parison while the plastic of the parison is free to expand all the way to the end face 70 of the mold 36; or just short of the end face as a result of the cushion of air caused by the supply of air under pressure through the inlet 72 at a slightly higher rate than the discharge of air from the outlet 74. This air cushion prevents the plastic from pressing against the side wall of the cavity 36 with sufficient friction to prevent expansion and stretching of the parison lengthwise along substantially the full length of the cavity 36.

Figure 4:
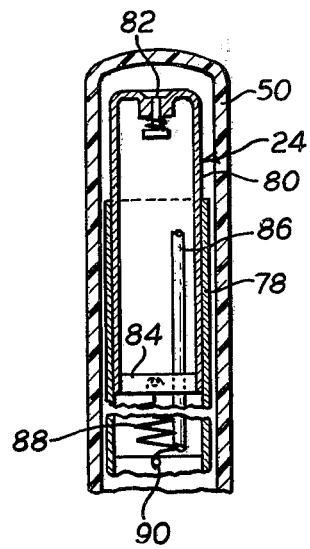
FIG. 4 is a fragmentary, diagrammatic and greatly enlarged view through the core rod when expanded as in the first blowing mold; the view being taken along the line 4—4 of FIG. 3.

FIG. 4 is a diagrammatic showing of the end portion of the core rod 24. The main body of the core rod, toward its outer end is a tubular structure 78. There is an end portion 80 of the core rod which telescopes into the tubular structure 78 as shown in FIG. 4. A check valve 82 in an end face of the end portion 80 prevents plastic from entering the core rod during the injection of the parison over the core rod.

The telescoping end portion 80 has a piston 84 closing its open cross section at one location; and when air is introduced into the core rod 24 behind the piston 84, the piston 84 pushes the telescoping end portion 80 forward to extend the length of the core rod so that there is a support for the partially blown parison or container 50 while in the mold 14 and during transfer of the partially blown container 50 to the second blowing mold 16 (FIG. 1).

FIG. 4 also shows a tube 86 which extends through an opening in the piston 84 and this tube 86 extends back to a source of compressed air which is used for blowing the parison on the core rod independently of any movement of the telescoping end portion 80.

Whenever the pressure behind the piston 84 is relieved, a spring 88, connected at opposite ends to the piston 84 and to a fixed pin 90 in the core rod, retracts the telescoping portion 80 back into the main body of the core rod 24.

Referring again to FIG. 3, a bail handle 92 is shown extending from one side of the partially blown container 50. A clearance between the mid portion of the handle 92 and the wall of the partially blown container 50 is indicated by the reference character 94. This clearance provides room for the insertion of the fingers of a human hand between the main grip portion of the handle 92 and the wall of the finally blown container 50. In the final blowing in the second blow mold this clearance 94 is reduced somewhat if the cavity of the second blow mold permits further expansion of the diameter of the handle 92, as is preferably the case. The clearance 94 remains sufficient, however, for the admission of the fingers of the hand of a person lifting the final container.

Figure 5:
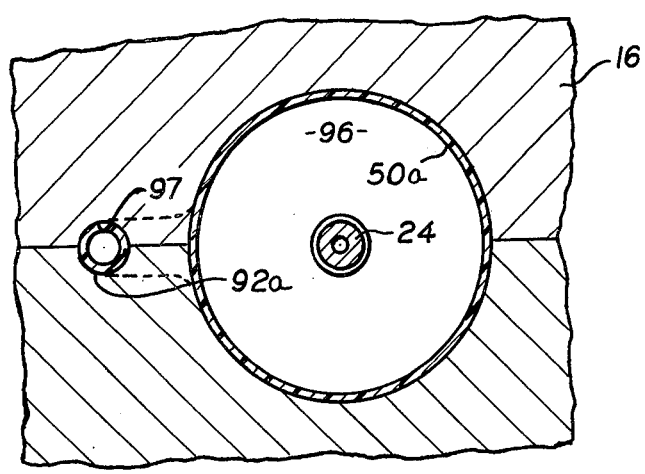
FIG. 5 is a greatly enlarged sectional view taken on the line 5—5 of FIG. 1.

FIG. 5 shows the container blown to its final cross section and indicated by the reference character 50a. The handle 92, blown to a slightly larger cross section, is indicated by the reference character 92a.

The mold 16 has a cavity 96 with a handle portion 97 shaped to the desired final contour of the handle 92a. It will be understood that the cavity 97 must be shaped to receive the handle portion 92 of the partially blown container 50.

The second blow mold 16 opens in the manner conventional with other blow molding apparatus and the indexing head 20 (FIG. 1) turns 90° to carry the core rod 24 and the container 50a to the stripper station 18 at which the container 50a is pushed off the core rod 24, in accordance with conventional practice. The neck 99 of the container is handled at all of the operational stations in the manner conventional for blow molding containers with threaded or unthreaded neck portions.

The preferred embodiment of the invention has been illustrated and described, but changes and modifications can be made and some features can be used in different combinations without departing from the invention as defined in the claims.

What is claimed is:

1. The method of making a container with a hollow handle by injection blow molding, which method comprises injection molding a parison on a core rod, transferring the core rod and parison from an injection mold to a first blow mold having a cavity which is longer than the parison, which has a diameter greater than that of the parison, and which has portion of the first blow mold cavity confining the plastic of the parison to a limited circumferential stretching during the partial blowing of the parison in the first blow mold, and stretching the material of the parison lengthwise of the core rod by the partial blowing with such longitudinal stretching being greater than the increase in diameter during the partial blowing step applying fluid under pressure to the mold cavity of the first blow mold on the outside of the parison during the partial blowing so as to maintain a fluid cushion around the outside of the parison for limiting movement of the parison into contact with cavity walls of the first blow mold and to allow for the longitudinal stretching brought together over an area bounded on three sides by a hollow part of the handle portion and on the fourth side by part of the parison that was not displaced into said clearance on one side of the cavity, shearing the compressed part from the rest of the handle portion and from the part of the parison that was not displaced into the handle portion of the cavity, removing the sheared material, and then transferring the core rod and partially blown container to a second blow mold having a cavity shaped to the desired contour of the finished container, blow molding the container in the second blow mold and thereafter stripping the container from the core rod.

2. The method described in claim 1 characterized by coating the core rod in the injection mold with a parison that has greater wall thickness on the side of the parison that is in position to expand into the handle portion of the cavity of the first blow mold.

3. The method of claim 2, said core rod being horizontally disposed and further comprising expanding the parison horizontally outwardly from the core rod and vertically compressing said part of the handle portion, so that the handle portion lies in a horizontal plane.

4. The method of claim 3, further comprising applying a force transverse to the shearing force, to the sheared material for removing same.

5. The method described in claim 1 characterized by confining the partially blown container in the second blow mold with cavity walls blocking off space between the handle portion and the body of the partially blown container from which plastic of the parison was sheared after blowing the parison in the first blow mold, and blocking off sufficient space to leave clearance for the fingers of a human hand to fit between the handle portion and the body portion of the container after completion of the blowing in the second blow mold.

6. The method described in claim 5 characterized by blocking off only a portion of the space between the handle portion and the body of the partially blown container from which plastic of the parison was sheared after blowing the parison in the first blow mold, and expanding the plastic of the partially blown container into some of said space during the blowing operation in the second blow mold.

7. The method described in claim 5 characterized by leaving a part of the unblocked portion of said space adjacent to the handle portion of the partially blown container and with said space extending along the length of the handle, and blowing the handle to larger cross section during the blowing operation in said second blow mold.

8. The method described in claim 7 characterized by blowing both the handle portion and the body of the container to a larger cross section in the second blow mold.

9. The method described in claim 1 characterized by shearing the compressed part of the plastic from the rest of the partially blown container while the partially blown container is still in the first blow mold.

10. The method described in claim 1 characterized by applying pressure in opposite directions against the plastic that is to be sheared from the handle portion and the body of the partially blown container with displacement of the compressed plastic while the plastic is hot enough to fuse together at the edges of the handle portion from which the compressed plastic is sheared and to also fuse together at the line of shearing of the compressed plastic from the body portion of the partially blown container.

11. The method described in claim 10 characterized by shearing the compressed plastic from the handle and body portion and completely displacing said sheared plastic from any contact with the other plastic of the partially blown container while the material from which the compressed plastic is sheared remains at fusion temperature.

12. The method described in claim 1 characterized by biaxially orienting the plastic by stretching it longitudinally in the first blow mold and stretching it circumferentially in the second blow mold.

13. The method described in claim 12 characterized by blowing fluid into the inside of the parison to cause the partial blowing in the first blow mold and to increase the length of the partially blown container so as to stretch the plastic in the direction of the length of the core rod, and extending the length of the core rod within the partially blown container to provide support for the partially blown container while in the first blow mold, and transferring the partially blown container to the second blow mold while it is supported by the extension of the length of the core rod.

14. The method of claim 1, said core rod being horizontally disposed and further comprising expanding the parison horizontally outwardly from the core rod and vertically compressing said part of the handle portion, so that the handle portion lies in a horizontal plane.

15. The method of claim 14, further comprising applying a force transverse to the shearing force, to the sheared material for removing same.

16. The method of making a container with a hollow handle by injection molding, which method comprises injection molding a parison on a core rod, transferring the core rod and parison from an injection mold to a first blow mold having a cavity with clearance on one side thereof for expansion of the parison into a handle portion, blowing the parison and expanding it on one side into a handle portion of the blow mold cavity, compressing a part of the handle portion until opposite sides thereof are brought together over an area bounded on three sides by a hollow part of the handle portion and on the fourth side by part of the handle portion and on the fourth side by part of the parison that was not displaced into said clearance on one side of the cavity, shearing the compressed part from the rest of the handle portion and from the part of the parison that was not displaced into the handle portion of the cavity, removing the sheared material, and then transferring the core rod and partially blown container to a second blow mold having a cavity shaped to the desired contour of the finished container, blow molding the container in the second blow mold and thereafter stripping the container from the core rod, characterized by maintaining pressure against both sides of the plastic during the compressing of the plastic, and shearing the plastic from the hollow handle and body of the partially blown container by moving both of the compressing forces in the same direction substantially normal to the plane of the compressed plastic, further characterized by applying force to the side of the compressed plastic on a supporting surface, lowering the supporting surface with the sheared plastic thereon and stripping the sheared plastic from the supporting surface by projecting displacing elements through the supporting surface to lift the sheared plastic from said surface, and while the sheared plastic is thus lifted, applying a transverse force to the sheared plastic to remove it from the supporting surface.

* * * * *